US012634700B2

(12) United States Patent
Wang et al.

(10) Patent No.: US 12,634,700 B2
(45) Date of Patent: May 19, 2026

(54) COMMUNICATION METHOD AND APPARATUS FOR TRUSTED OR UNTRUSTED RELAY, TERMINAL, AND NETWORK SIDE DEVICE

(71) Applicant: VIVO MOBILE COMMUNICATION CO., LTD., Dongguan (CN)

(72) Inventors: Wen Wang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 323 days.

(21) Appl. No.: 18/210,069

(22) Filed: Jun. 14, 2023

(65) Prior Publication Data

US 2023/0328532 A1     Oct. 12, 2023

Related U.S. Application Data

(63) Continuation of application No. PCT/CN2021/138236, filed on Dec. 15, 2021.

(30) Foreign Application Priority Data

Dec. 17, 2020    (CN) .......................... 202011503936.8

(51) Int. Cl.
*H04W 12/50*          (2021.01)
*H04W 12/03*          (2021.01)
(Continued)

(52) U.S. Cl.
CPC ........... *H04W 12/50* (2021.01); *H04W 12/03* (2021.01); *H04W 12/0431* (2021.01);
(Continued)

(58) Field of Classification Search
CPC ..................................................... H04W 12/50
See application file for complete search history.

(56) References Cited

U.S. PATENT DOCUMENTS 8,594,632 B1 * 11/2013  Azizi ................... H04W 12/06
                                                                715/752
8,812,657 B2 * 8/2014  Mallik ............... H04L 67/1061
                                                                709/203
(Continued)

FOREIGN PATENT DOCUMENTS

CN          104469695 A        3/2015
CN          106162803 A        11/2016
(Continued)

OTHER PUBLICATIONS

International Search Report issued in corresponding International Application No. PCT/CN2021/138236, mailed Mar. 4, 2022, 4 pages.
(Continued)

*Primary Examiner* — William G Trost, IV
(74) *Attorney, Agent, or Firm* — IPX PLLC

(57)          ABSTRACT

A communication method and apparatus for a relay, a terminal, and a network side device are provided. The communication method includes: receiving, by first user equipment (UE), relationship information delivered from a network side, where the relationship information is used to indicate a trust relationship of the first UE; receiving, by the first UE, identification information sent by second UE; and based on the relationship information and the identification information, performing, by the first UE, relay connection or relay communication with the second UE, or refusing, by the first UE, to perform relay connection or relay communication with the second UE.

18 Claims, 7 Drawing Sheets

700

(51) Int. Cl.

| | | |
|---|---|---|
| *H04W 12/0431* | (2021.01) | |
| *H04W 12/60* | (2021.01) | |
| *H04W 76/14* | (2018.01) | |
| *H04W 12/06* | (2021.01) | |

(52) U.S. Cl.

CPC .......... *H04W 12/66* (2021.01); *H04W 76/14* (2018.02); *H04W 12/06* (2013.01)

(56) References Cited

U.S. PATENT DOCUMENTS

| | | | |
|---|---|---|---|
| 10,736,070 B2 | 8/2020 | Russell et al. | |
| 2008/0045181 A1* | 2/2008 | Suzuki .................. | H04W 12/06 |
| | | | 455/411 |
| 2011/0096752 A1* | 4/2011 | Yuk ..................... | H04W 12/062 |
| | | | 370/331 |
| 2011/0314522 A1 | 12/2011 | Palanigounder | |
| 2014/0162601 A1* | 6/2014 | Kim ...................... | H04W 8/005 |
| | | | 455/411 |
| 2016/0205555 A1* | 7/2016 | Agiwal ................. | H04W 12/03 |
| | | | 713/168 |
| 2017/0325270 A1* | 11/2017 | Tenny ................... | H04W 76/14 |
| 2020/0259786 A1* | 8/2020 | Saarinen ............. | H04L 63/0414 |
| 2022/0279348 A1* | 9/2022 | Youn .................... | H04W 12/06 |

FOREIGN PATENT DOCUMENTS

| | | |
|---|---|---|
| CN | 106162929 A | 11/2016 |
| CN | 106470382 A | 3/2017 |
| CN | 107889080 A | 4/2018 |
| CN | 108243631 A | 7/2018 |
| CN | 109716810 A | 5/2019 |
| WO | 2008034319 A1 | 3/2008 |

OTHER PUBLICATIONS

Samsung, Updates to solution#1 in TR 33.847, 3GPP TSG-SA3 Meeting #100bis-e, S3-202683, Oct. 12-16, 2020, 4 pages.

Samsung, Updates to solution#1 in TR 33.847, 3GPP TSG-SA3 Meeting #100bis-e, S3-202611, Oct. 12-16, 2020, 4 pages.

Extended European Search Report issued in related European Application No. 21905735.3, mailed Feb. 26, 2024, 7 pages.

3gpp: "3rd Generation PartnershipProject; Technical Specification Group Services and System Aspects; Study on architecture enhancements to support Proximity-based Services (Prose) (Release 12) II" Feb. 1, 2014 (Feb. 1, 2014), XP093127619, pp. 1-324.

First Office Action issued in related Chinese Application No. 202011503936.8, mailed Jan. 30, 2024, 11 pages.

InterDigital Communications, "Solution for authorization and security with UE-to-Network relay using Remote UE network primary authentication", 3GPP tsg_sa\wg3, 100bis, S3-202665, Oct. 2020, 3 pages.

LG Electronics Inc.,"TR 33.847-Solution for secondary authentication in relay communication" 3GPP tsg_sa\wg3_security, S3-203351, Nov. 2020, 5 pages.

Ericsson, "Mobility aspects of UE-to-Network Relaying", 3GPP tsg_ran\WG2_RL2, R2-154155, Sep. 2015, 5 pages.

* cited by examiner

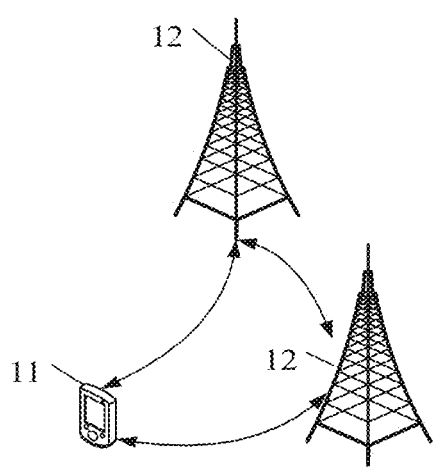
FIG. 1
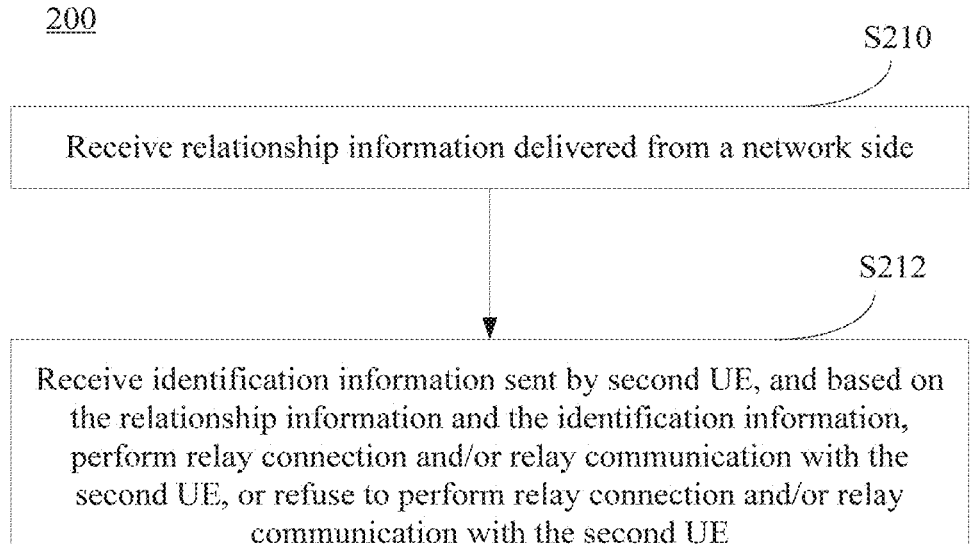
FIG. 2
300                                                                    S310
Send relationship information to first UE, where the relationship
information is used to indicate a trust relationship of the first UE
FIG. 3

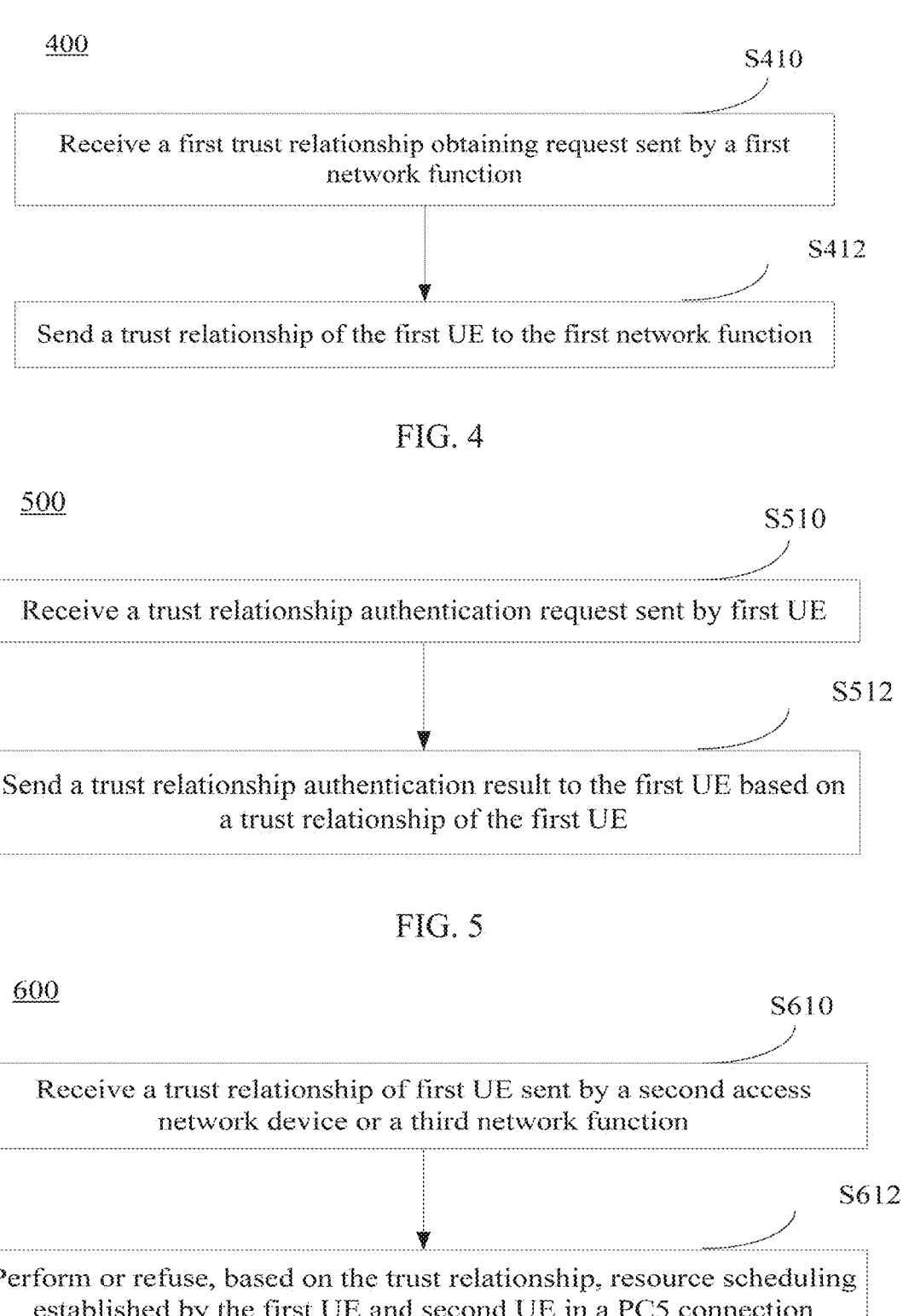

400

S410

Receive a first trust relationship obtaining request sent by a first network function

S412

Send a trust relationship of the first UE to the first network function

Receive a trust relationship authentication request sent by first UE

S512

Send a trust relationship authentication result to the first UE based on a trust relationship of the first UE

Receive a trust relationship of first UE sent by a second access network device or a third network function

S612

Perform or refuse, based on the trust relationship, resource scheduling established by the first UE and second UE in a PC5 connection

COMMUNICATION METHOD AND APPARATUS FOR TRUSTED OR UNTRUSTED RELAY, TERMINAL, AND NETWORK SIDE DEVICE

CROSS-REFERENCE

This application is a continuation of International Application No. PCT/CN2021/138236, filed Dec. 15, 2021, which claims priority to Chinese Patent Application No. 202011503936.8, filed Dec. 17, 2020. The entire contents of each of the above-referenced applications are expressly incorporated herein by reference.

TECHNICAL FIELD

This application pertains to the field of wireless communication technologies, and in particular, to a communication method and apparatus for trusted or untrusted relay, a terminal, and a network side device.

BACKGROUND

In the existing communications system, as for Layer 3 (L3) relay communication, in a scenario without a Non-3GPP InterWorking Function (N3IWF), relay user equipment (UE) can identify data of remote UE (above a Packet Data Convergence Protocol (PDCP)) at the level of Protocol Data Unit (PDU) layer, and if the relay UE is not a trusted relay, there may be security risks or privacy risks. However, in the current relay communication, when establishing relay connection and/or relay communication, no technical solution is given to determine whether the communication peer is trustworthy.

SUMMARY

Embodiments of this application provide a communication method and apparatus for trusted or untrusted relay, a terminal, and a network side device.

According to a first aspect, a communication method for trusted or untrusted relay is provided, where the method is applied to first UE and includes: receiving relationship information delivered from a network side, where the relationship information is used to indicate a trust relationship of the first UE; and receiving identification information sent by second UE, and, based on the relationship information and the identification information, performing relay connection and/or relay communication with the second UE, or refusing to perform relay connection and/or relay communication with the second UE.

According to a second aspect, a communication apparatus for trusted or untrusted relay is provided, including: a first receiving module, configured to receive relationship information delivered from a network side, where the relationship information is used to indicate a trust relationship of the first UE; a second receiving module, configured to receive identification information sent by second UE; and a communications module, configured to: based on the relationship information and the identification information, perform relay connection and/or relay communication with the second UE, or refuse to perform relay connection and/or relay communication with the second UE.

According to a third aspect, a communication method for trusted or untrusted relay is provided, where the method is applied to a first network function and includes: sending relationship information to first UE, where the relationship information is used to indicate a trust relationship of the first UE.

According to a fourth aspect, a communication apparatus for trusted or untrusted relay is provided, including: a first obtaining module, configured to obtain relationship information, where the relationship information is used to indicate a trust relationship of the first UE; and a second sending module, configured to send the relationship information.

According to a fifth aspect, a communication method for trusted or untrusted relay is provided, where the method is applied to a second network function and includes: receiving a first trust relationship obtaining request sent by a first network function, where the first trust relationship obtaining request carries a user identifier or a terminal identifier of first UE; and sending a trust relationship of the first UE to the first network function.

According to a sixth aspect, a communication apparatus for trusted or untrusted relay is provided, including: a fourth receiving module, configured to receive a first trust relationship obtaining request sent by a first network function, where the first trust relationship obtaining request carries a user identifier or a terminal identifier of first UE; and a third sending module, configured to send a trust relationship of the first UE to the first network function.

According to a seventh aspect, a communication method for trusted or untrusted relay is provided, where the method is applied to a third network function and includes: receiving a trust relationship authentication request sent by first UE, where the trust relationship authentication request carries a user identifier or terminal identification information of second UE; and sending a trust relationship authentication result to the first UE based on a trust relationship of the first UE.

According to an eighth aspect, a communication apparatus for trusted or untrusted relay is provided, including: a fifth receiving module, configured to receive a trust relationship authentication request sent by first UE, where the trust relationship authentication request carries a user identifier or terminal identification information of second UE; and a fourth sending module, configured to send a trust relationship authentication result to the first UE based on a trust relationship of the first UE.

According to a ninth aspect, a communication method for trusted or untrusted relay is provided, where the method is applied to a first access network device and includes: receiving a trust relationship of first UE sent by a second access network device or a third network function; and performing or refusing, based on the trust relationship, resource scheduling established by the first UE and second UE in a PC5 connection.

According to a tenth aspect, a communication apparatus for trusted or untrusted relay is provided, including: a sixth receiving module, configured to receive a trust relationship of first UE sent by a second access network device or a third network function; and an execution module, configured to: perform or refuse, based on the trust relationship, resource scheduling established by the first UE and second UE in a PC5 connection.

According to an eleventh aspect, a terminal is provided, where the terminal includes a processor, a memory, and a program or an instruction stored in the memory and executable on the processor, and when the program or the instruction is executed by the processor, steps of the method according to the first aspect are implemented.

According to a twelfth aspect, a network side device is provided, where the network side device includes a processor, a memory, and a program or an instruction stored in the memory and executable on the processor, and when the program or the instruction is executed by the processor, steps of the method according to the third aspect, the fifth aspect, the seventh aspect, or the ninth aspect are implemented.

According to a thirteenth aspect, a readable storage medium is provided, where the readable storage medium stores a program or an instruction, and when the program or the instruction is executed by a processor, steps of the method according to the first aspect, the third aspect, the fifth aspect, the seventh aspect, or the ninth aspect are implemented.

According to a fourteenth aspect, a chip is provided, where the chip includes a processor and a communications interface, the communications interface is coupled to the processor, the processor is configured to run a terminal program or instruction, to implement steps of the method according to the first aspect, and the processor is configured to run a program or an instruction of a network side device, to implement steps of the method according to the third aspect, the fifth aspect, the seventh aspect, or the ninth aspect.

According to a fifteenth aspect, a computer program product is provided, where the computer program product is stored in a non-transitory storage medium, and when the computer program product is executed by the processor, steps of the method according to the first aspect, the third aspect, the fifth aspect, the seventh aspect, or the ninth aspect are implemented.

In this embodiment of this application, the first UE receives the relationship information that indicates the trust relationship of the first UE and that delivered from the network side, and when receiving the identification information sent by the second UE, based on the relationship information and the identification information, performs relay connection and/or relay communication with the second UE, or refuses to perform relay connection and/or relay communication with the second UE. That is, when judging, based on the trust relationship and the identification information, that the second UE is the trusted UE, the first UE performs relay connection and/or relay communication with the second UE, otherwise, refuses to perform relay connection and/or relay communication with the second UE. So as to ensure that relay connection and/or relay communication are/is performed only with the credit UE, and ensure the security of relay communication.

BRIEF DESCRIPTION OF DRAWINGS

FIG. 1 is a schematic diagram of a wireless communications system to which an embodiment of this application can be applied;

FIG. 2 is a schematic flowchart of a communication method for trusted or untrusted relay according to an embodiment of this application;

FIG. 3 is another schematic flowchart of a communication method for trusted or untrusted relay according to an embodiment of this application;

FIG. 4 is still another schematic flowchart of a communication method for trusted or untrusted relay according to an embodiment of this application;

FIG. 5 is still another schematic flowchart of a communication method for trusted or untrusted relay according to an embodiment of this application;

FIG. 6 is still another schematic flowchart of a communication method for trusted or untrusted relay according to an embodiment of this application;

DETAILED DESCRIPTION

Figure 7:
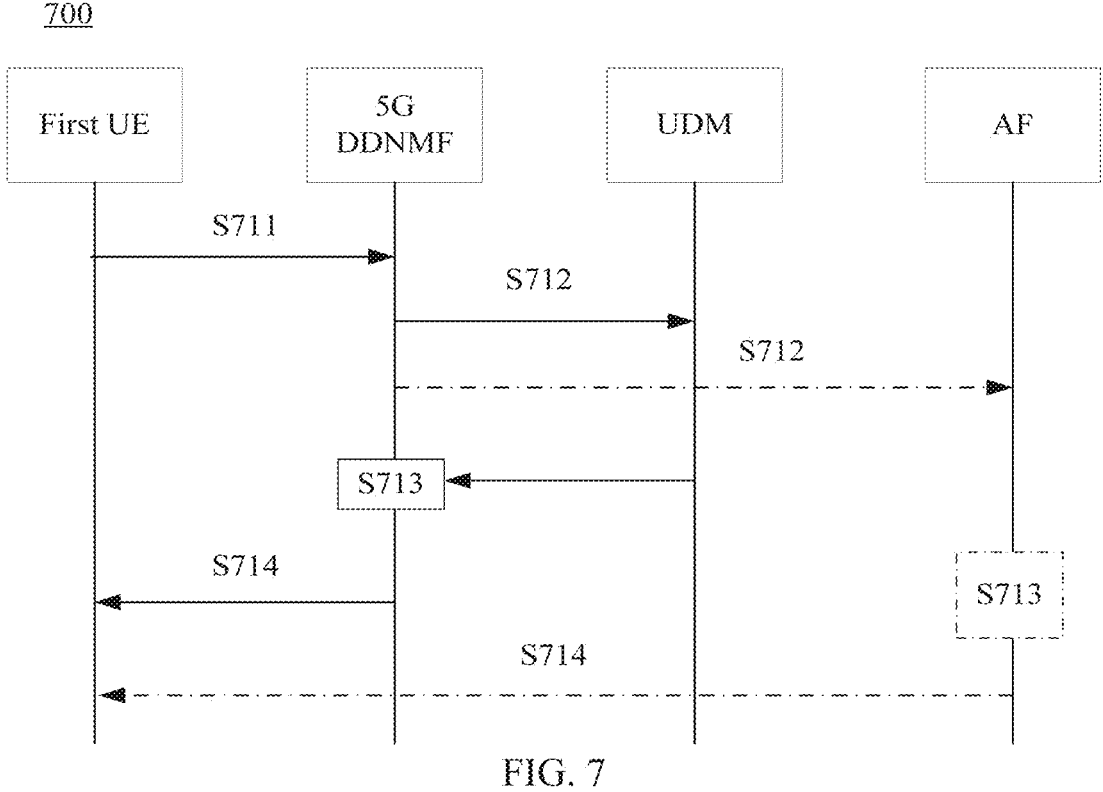
FIG. 7 is still another schematic flowchart of a communication method for trusted or untrusted relay according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application shall fall within the protection scope of this application.

Terms "first" and "second" in the specification and claims of this application are used to distinguish between similar objects, and do not need to be used to describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. A New Radio (NR) system is described in the following description for illustrative purposes, and the NR terminology is used in most of the following description, although these technologies can also be applied to applications other than the NR system application, such as the $6^{th}$ Generation (6G) communications system.

FIG. 1 is a schematic diagram of a wireless communications system to which an embodiment of this application can be applied. The wireless communications system includes a terminal 11 and a network side device 12. The terminal 11 may also be referred to as a terminal device or UE. The terminal 11 may be a terminal side device, for example, a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, and the like. It should be noted that a specific type of the terminal 11 is not limited in the embodiments of this application. The network side device 12 may be a base station (namely, an access network device) or a core network. The base station may be referred to as a NodeB, an evolved Node B, an access point, a Base Transceiver Station (BTS), a radio base station, a radio transceiver, a Basic Service Set (BSS), an Extended Service Set (ESS), a home NodeB, a home evolved NodeB, a WLAN access point, a WiFi node, a Transmitting Receiving Point (TRP), or another suitable term in the field provided that a same technical effect is achieved. The base station is not limited to a specific technical term. It should be noted that, in the embodiments of this application, only a base station in an NR system is used as an example, but a specific type of the base station is not limited.

The core network may include a plurality of network functions, such as a direct discovery name management function (DDNMF), a unified data management (UDM) function, and an access and mobility management function (AMF). These network functions can be set on a same network entity or different network entities.

With reference to the accompanying drawings, the communication method for trusted or untrusted relay provided in the embodiments of this application is described in detail by using specific embodiments and application scenarios.

FIG. 2 is a schematic flowchart of a communication method for trusted or untrusted relay according to an embodiment of this application. The method 200 may be performed by first UE. In other words, the method may be performed by software or hardware installed in the first UE. As shown in FIG. 2, the method may include the following steps.

S210. Receive relationship information delivered from a network side, where the relationship information is used to indicate a trust relationship of the first UE.

In this embodiment of this application, the network side may deliver relationship information indicating the trust relationship (also referred to as a binding relationship) of the first UE to the first UE, and the first UE may determine, based on the relationship information, which UEs are trusted UEs, that is, credit UEs.

In a possible implementation, the relationship information may include at least one of the following (1) to (7).

(1) First relay service code. For example, the network side may send the association identifier to the first UE and the second UE with trust relationship. In a relay discovery stage or a connection establishment stage, the second UE may send the first relay service code as part or all of the identification information to the first UE. Based on the received identification information and the first relay service code sent from the network side, the first UE confirms that the second UE is credit UE, and selects the second UE to establish a relay connection.

(2) Association identifier. The association identifier is used to indicate that the first UE has a trust relationship with the second UE, or the association identifier is used to indicate a terminal identifier or a user identifier of the second UE that has a trust relationship with the first UE. That is, in this possible implementation, the relationship information delivered from the network side may indicate that the first UE has a trust relationship with the second UE. For example, it can be a corresponding relationship between the terminal identifier or the user identifier of the first UE and the terminal identifier or the user identifier of the second UE. The association identifier may also be the terminal identifier or the user identifier of the second UE that has a trust relationship with the first UE, that is, the association identifier may be one or more terminal identifiers or user identifiers, indicating that the second UE corresponding to the one or more terminal identifiers or user identifiers has a trust relationship with the first UE, that is, the second UE corresponding to the one or more terminal identifiers or user identifiers is credit UE.

(3) First group key. Communications UEs with trust relationship have a same first group key. For example, the network side may deliver the first group key to the first UE and the second UE that have a trust relationship. In the process of relay discovery or relay connection, the second UE may use the first group key to encrypt communication information, and if the first UE successfully decrypts the communication information by using the first group key, it is confirmed that the second UE is the credit UE. In the process of relay discovery or relay connection, the second UE may also use the first group key to sign information to be authenticated (for example, the terminal identifier or the user identifier of the second UE), and send signature information (which may also be referred to as verification information) to the first UE. The first UE uses the first group key delivered from the network side to verify the signature information, and if the verification is successful, it is confirmed that the second UE is the credit UE.

(4) Authentication information. The authentication information is used to verify the identification information. For example, the network side may deliver authentication information to the first UE and the second UE that have a trust relationship. In the process of relay discovery or relay connection, the second UE may use the authentication information to generate identification information and send the identification information to the first UE. The first UE uses the authentication information to verify the identification information, and if the verification is successful, it is confirmed that the second UE is the credit UE. The authentication information can be information such as a verification code and a password.

(5) First service type information. It is indicated, by using the first service type information, that UE executing a service indicated by the first service type information has a trust relationship. In this possible implementation, the network side may consider that there is a trust relationship between communications UEs of a specific service type. In the process of relay discovery or relay connection, the first UE determines a service type of the second UE based on the identification information of the second UE, judges whether the service type of the second UE is the specific service type, and if so, it is confirmed that the second UE is the credit UE.

(6) First slice information. It is indicated, by using the first slice information, that the communications UE on the slice indicated by the first slice information has a trust relationship. In this possible implementation, the network side may consider that there is a trust relationship between communications UEs on the specific slice. In the process of relay discovery or relay connection, the first UE determines, based on the identification information of the second UE, a slice on which the second UE is located, judges whether the slice on which the second UE is located is the slice indicated by the first slice information, and if so, it is confirmed that the second UE is the credit UE.

(7) First protocol data unit (PDU) session type information. It is indicated, by using the first PDU session type, that communications UE executing a PDU session of a type indicated by the first PDU session type information has a trust relationship. In this possible implementation, the network side may consider that there is a trust relationship between communications UEs executing a specific PDU session type. In the process of relay discovery or relay connection, the first UE determines, based on the identification information of the second UE, a PDU session executed by the second UE, judges whether the PDU session executed by the second UE is a PDU session indicated by the first PDU session type information, and if so, it is confirmed that the second UE is the credit UE.

It should be noted that the relationship information may include only any one of (1) to (7) described above, or any combination of two or more of (1) to (7) described above. For example, the relationship information may include the first relay service code and the first group key, so that the first UE may judge, based on the first relay service code in the process of relay discovery or relay connection, whether to select the second UE for relay communication, and if so, the first UE and the second UE authenticate each other based on the second group key to determine whether the peer is the credit UE. In a specific application, there can be other combinations. Details are not limited in this embodiment of this application.

S212. Receive identification information sent by second UE, and based on the relationship information and the identification information, perform relay connection and/or relay communication with the second UE, or refuse to perform relay connection and/or relay communication with the second UE.

In S212, the first UE judges, based on the relationship and the identification information, whether the second UE is the credit UE, that is, whether the second UE is trustworthy. If it is determined that the second UE is the credit UE, the second UE is selected to perform relay connection and/or relay communication.

In a possible implementation, the identification information may include at least one of the following (1) to (7).

(1) Second relay service code. The second relay service may be delivered from the network side to the second UE.

(2) Terminal identifier or user identifier of the second UE. In this possible implementation, correspondingly, the relationship information delivered from the network side includes the association identifier.

(3) Encrypted information or authentication information generated based on a second group key. In this possible implementation, the second UE may generate the encrypted information or the authentication information based on the second group key delivered from the network side. In a specific application, the encrypted information may be information obtained from the second UE encrypting information to be encrypted with the second group key, for example, the information to be encrypted may be a terminal identifier or a user identifier of the second UE, or the information to be encrypted may also be communication information sent by the second UE to the first UE. The authentication information may be a result (for example, signature information) obtained from the second UE using the second group key to calculate information to be authenticated according to a predetermined algorithm, where the information to be authenticated may be the terminal identifier or the user identifier of the second UE, a random number generated by the second UE, or the like. In this possible implementation, correspondingly, the relationship information delivered from the network side includes the group key.

(4) Verification information. The verification information is a result obtained from verifying and calculating specified information to be verified, for example, the information to be verified may be a second relay service code delivered from the network side to the second UE, information about a slice where the second UE is located, PDU session information executed by the second UE, or the like. The second UE uses predetermined authentication information to verify and calculate the information to be verified to obtain the verification information, where the predetermined authentication information can be a verification code, a password, or the like delivered from the network side.

(5) Second service type information. The second service type information indicates a service type of a service executed by the second UE.

(6) Second slice information. The second slice information indicates a slice where the second UE is located. In this possible implementation, the relationship information may include the slice information.

(7) Second PDU session type information. The second PDU session type information indicates the PDU session type executed by the second UE.

It should be noted that the identification information may include only any one of (1) to (7) described above, or any combination of two or more of (1) to (7) described above. For example, the identification information may include the second relay service code and the second group key, so that the first UE may judge, in the process of relay discovery or relay connection based on the second relay service code sent by the second UE, whether to select the second UE for relay communication, and if so, the first UE and the second UE authenticate each other based on the second group key to determine whether the peer is the credit UE. In a specific application, there can be other combinations. Details are not limited in this embodiment of this application.

In addition, the identification information may be corresponding to the relationship information. For example, if the relationship information includes the first relay service code, the identification information includes the second relay service code, and if the relationship information includes the PDU session type, the identification information includes the PDU session type executed by the second UE. The identification information may not be corresponding to the relationship information. For example, the identification information may include the second PDU session type executed by the second UE and the second relay service code, while the relationship information may not include the PDU session type but include the first relay service code, so that the first UE may judge, based on the first relay service code and the second relay service code, whether the second UE is the credit UE. Details are not limited in this embodiment of this application as long as the first UE can judge whether the second UE has a trust relationship with the first UE based on the relationship information and the identification information.

It should be noted that in an actual application, the relationship information delivered from the network side and the identification information sent by the second UE are not received in a specific sequence. For example, the first UE may receive the relationship information delivered from the network side before receiving the identification information sent by the second UE, or the first UE may receive the identification information sent by the second UE before receiving the relationship information delivered from the network side.

For example, in a possible implementation, before S210, if the method further includes: sending the identification information of the second UE to the network side, S210 may include: receiving a result returned by the network side for the identification information of the second UE, where the result includes the relationship information. That is, in this possible implementation, after receiving the identification information sent by the second UE, the first UE sends the identification information of the second UE to the network side, and the network side returns the relationship information to the first UE after receiving the identification information of the second UE. Through this possible implementation, the first UE may obtain the relationship information from the network side in relay discovery or relay connection, that is, in a case that it is necessary to verify whether the second UE is the credit UE.

In a possible implementation, in S212, after judging that the second UE is the credit UE, the first UE may select to perform relay connection and/or relay communication with the second UE. In the process of performing relay connection and/or relay communication, the first UE may also request the network side to authenticate the second UE again, so as to prevent the received relationship information from being obtained by another untrusted UE during the discovery process. Therefore, in this possible implementation, the method may further include: sending, by the first UE, a trust relationship authentication request to a third network function when performing relay connection and/or relay communication with the second UE, where the trust relationship authentication request carries the user identifier or terminal identification information of the second UE; receiving a trust relationship authentication result sent by a third network function; and performing relay connection and/or relay communication with the second UE based on the trust relationship authentication result, or refusing to perform relay connection and/or relay communication with the second UE. In this possible implementation, the first UE sends the trust relationship authentication request to the third network function, requesting the third network function to authenticate the trust relationship between the first UE and the second UE. After receiving the trust relationship authentication request, the third network function authenticates the trust relationship between the first UE and the second UE and returns the authentication result to the first UE. When the trust relationship authentication result returned by the third network function indicates that the first UE and the second UE have a trust relationship, the first UE performs relay connection and/or relay communication with the second UE, or refuses to perform relay connection and/or relay communication with the second UE when the trust relationship authentication result indicates that the first UE and the second UE do not have a trust relationship. Through this possible implementation, it can be avoided that the relationship information is obtained by another untrusted UE in the discovery process to masquerade as the trusted UE of the first UE, thereby further ensuring the security of relay communication.

In the foregoing possible implementation, the third network function may be the AMF. The third network function may judge, based on the trust relationship of the first UE, whether the first UE and the second UE have a trust relationship.

In the communication method for trusted or untrusted relay provided in this embodiment of this application, the first UE receives the relationship information that indicates the trust relationship of the first UE and that delivered from the network side, and when receiving the identification information sent by the second UE, based on the relationship information and the identification information, performs relay connection and/or relay communication with the second UE, or refuses to perform relay connection and/or relay communication with the second UE. That is, when judging, based on the trust relationship and the identification information, that the second UE is the trusted UE, the first UE performs relay connection and/or relay communication with the second UE, otherwise, refuses to perform relay connection and/or relay communication with the second UE. So as to ensure that relay connection and/or relay communication are/is performed only with the credit UE, and ensure the security of relay communication.

FIG. 3 is another schematic flowchart of a communication method for trusted or untrusted relay according to an embodiment of this application. The method 300 may be performed by a first network function. In other words, the method may be performed by software or hardware installed in the first network function. As shown in FIG. 3, the method may include the following steps.

S310. Send relationship information to first UE, where the relationship information is used to indicate a trust relationship of the first UE.

In this embodiment of this application, the relationship information is the same as that in the method 200. For details, refer to the related descriptions in the method 200. Details are not provided herein again.

In this embodiment of this application, the first network function may send the relationship information to each member UE having a trust relationship. For example, if the first UE has a trust relationship with the second UE, the first network function may send the relationship information to both the first UE and the second UE.

In a possible implementation, the first network function may obtain the trust relationship of the first UE from the second network function or the application server, and send the relationship information to the first UE based on the trust relationship. Therefore, in this possible implementation, before S310, the method may further include the following Step 1 and Step 2.

Step 1. Send a trust relationship obtaining request to a second network function or an application server, where the trust relationship obtaining request carries a user identifier or a terminal identifier of the first UE.

Step 2. Receive the trust relationship of the first UE returned by the second network function or the application server.

The trust relationship may be an association relationship between two or more users, that is, the trust relationship indicates the association relationship between two or more users. For example, having an association relationship at a signing level. For example, if the first UE indicates that it can be remote UE of the second UE when signing a contract, or the second UE indicates that it can be relay UE of the first UE when signing a contract, the first UE and the second UE have an association relationship.

In some embodiments, the trust relationship obtaining request may also carry the user identifier or terminal identifier of the second UE, that is, the trust relationship obtaining request is used to request to obtain the trust relationship between the first UE and the second UE.

In some embodiments, the two or more users may be users of one of the following: a specific service, a specific slice, a specific Data Network Name (DNN), or a specific PDU session. That is, there is an association relationship between two or more users with a specific service, a specific slice, a specific DNN, or a specific PDU session. That is, these users may have credit UEs, where UE corresponding to one user may be used as relay UE of UE corresponding to another user.

In the foregoing possible implementation, the second network function may return the trust relationship to the first network function, while the application server may generate the relationship information based on the trust relationship, and transparently transmit the relationship information to the first UE through the first network function. Therefore, S310 may include: generating the relationship information based on the trust relationship returned by the second network function and delivering the relationship information to the first UE; or forwarding the trust relationship returned by the application server to the first UE.

In a possible implementation of this embodiment of this application, the first network function may send the relationship information to the first UE is a case of receiving the identification information of the second UE sent by the first UE.

In this embodiment of this application, the first network function includes but is not limited to the DDNMF.

Through the communication method for trusted or untrusted relay provided in this embodiment of this application, the first network function may deliver the relationship information to the first UE, so that the first UE may judge, based on the relationship information, whether the communication peer, that is, the second UE, is trusted UE, thereby improving the security of relay communication.

FIG. 4 is another schematic flowchart of a communication method for trusted or untrusted relay according to an embodiment of this application. The method 400 may be performed by a second network function. In other words, the method may be performed by software or hardware installed in the second network function. As shown in FIG. 4, the method may include the following steps.

S410. Receive a first trust relationship obtaining request sent by a first network function, where the first trust relationship obtaining request carries a user identifier or a terminal identifier of first UE.

In this embodiment of this application, the first network function may be the first network function in the method 300, and the second network function may be the second network function in the method 300.

In this embodiment of this application, after receiving the first trust relationship obtaining request, the trust relationship of the first UE may be obtained based on the user identifier or the terminal identifier of the first UE.

In a possible implementation, the trust relationship is an association relationship between two or more users.

In some embodiments, the two or more users are users of one of the following: a specific service, a specific slice, a specific DNN, or a specific PDU session. After receiving the first trust relationship obtaining request, the second network function may judge, based on the user identifier or the terminal identifier of the first UE, whether the first UE belongs to a specific service, a specific slice, a specific DNN, and a specific PDU session, and if so, the trust relationship of the first UE may be obtained based on the specific service, the specific slice, the specific DNN, and the specific PDU session.

In a possible implementation, the user identifier or the terminal identifier of the second UE may also be carried in the first trust relationship obtaining request, then the second network function may judge, based on the user identifier or the terminal identifier of the first UE and the user identifier or the terminal identifier of the second UE, whether both the first UE and the second UE belong to a specific service, a specific slice, a specific DNN, and a specific PDU session, and if so, it is determined that the first UE and the second UE have a trust relationship.

S412. Send a trust relationship of the first UE to the first network function.

In this embodiment of this application, after receiving the trust relationship of the first UE, the first network function generates the relationship information and sends the relationship information to the first UE. For details, refer to the descriptions in the method 300. Details are not provided herein again.

In a possible implementation, the method may further include: receiving a second trust relationship obtaining request from a third network function, where the second trust relationship obtaining request carries identification information of the first UE; and sending the trust relationship of the first UE to the third network function.

In this embodiment of this application, the second network function includes but is not limited to the UDM.

Through the communication method for trusted or untrusted relay provided in this embodiment of this application, the second network function may send the trust relationship of the first UE to the first network function when receiving the trust relationship obtaining request of the first network function, so that the first network function may obtain the relationship information in the method 200 and the method 300 based on the trust relationship and send the relationship information to the first UE. Therefore, the first UE may judge, based on the relationship information in relay connection and/or relay communication, whether the relay peer is trusted UE, thereby ensuring the security of relay communication.

FIG. 5 is still another schematic flowchart of a communication method for trusted or untrusted relay according to an embodiment of this application. The method 500 may be performed by a third network function. In other words, the method may be performed by software or hardware installed in the third network function. As shown in FIG. 5, the method may include the following steps.

S510. Receive a trust relationship authentication request sent by first UE, where the trust relationship authentication request carries a user identifier or terminal identification information of second UE.

In a possible implementation, the first UE may send the trust relationship authentication request to the third network function when receiving the identification information of the second UE. For details, refer to the related descriptions in the method 200. Details are not provided herein again.

In this embodiment of this application, the third network function may be the third network function in the method 200 to the method 400.

S512. Send a trust relationship authentication result to the first UE based on a trust relationship of the first UE.

In this embodiment of this application, the third network function may judge, based on the trust relationship of the first UE, whether the second UE is trusted UE of the first UE, that is, judging whether the second UE has a trust relationship with the first UE.

In a possible implementation, the trust relationship may be the same as that in the method 400. For details, refer to the related descriptions in the method 400.

In a possible implementation, the third network function may judge, based on the user identifier or the terminal identifier of the first UE and the user identifier or the terminal identifier of the second UE, whether both the first UE and the second UE belong to a specific service, a specific slice, a specific DNN, and a specific PDU session, and if so, it is determined that the first UE and the second UE have a trust relationship.

When the trust relationship is one or more user identifiers or terminal identifiers, the third network function may judge whether the user identifier or the terminal identifier of the second UE is one of the one or more user identifiers or terminal identifiers, and if so, the second UE is the trusted UE of the first UE.

In a possible implementation, the first UE may send the trust relationship authentication result to the third network function when the second UE performs relay connection and/or relay communication. For details, refer to the related descriptions in the method 200. Details are not provided herein again.

In a possible implementation, the third network function may obtain the trust relationship of the first UE from the second network function. Therefore, in this possible implementation, before sending the trust relationship authentication result to the first UE, the method further includes: sending a trust relationship obtaining request to a second network function, where the trust relationship obtaining request carries identification information of the first UE; and receiving the trust relationship of the first UE returned by the second network function. For details, refer to the related descriptions in the method 400. Details are not provided herein again.

In another possible implementation, the third network function may also send the trust relationship of the first UE to an access network device corresponding to the first UE, so that the access network device may judge, when allocating a relay communication resource of the first UE and the second UE, whether the first UE and the second UE are credit UEs for each other, so as to determine whether to agree or refuse resource allocation of a network scheduling mode in relay communication between the first UE and the second UE.

Through the communication method for trusted or untrusted relay provided in this embodiment of this application, after receiving the trust relationship authentication request sent by the first UE, the third network function may authenticate the trust relationship between the first UE and the second UE, and return the authentication result to the first UE, so that the first UE may learn whether the second UE is trusted UE, and then judge whether to continue relay connection and/or relay communication with the second UE, so as to ensure the security of relay communication.

FIG. 6 is still another schematic flowchart of a communication method for trusted or untrusted relay according to an embodiment of this application. The method 600 may be performed by a first access network device. In other words, the method may be performed by software or hardware installed on the first access network device. As shown in FIG. 6, the method may include the following steps.

S610. Receive a trust relationship of first UE sent by a second access network device or a third network function.

In this embodiment of this application, the first access network device may receive the trust relationship of the first UE sent by the third network function. For details, refer to the related descriptions in the method 500.

For example, in a registration process or a service request process of the first UE, the first UE receives the trust relationship of the first UE sent by the third network function.

The first access network device may also receive the trust relationship sent by the second access network device. For example, in a handover process of the first UE, receiving the trust relationship sent by the second access device, where the second access device is a source access device in the handover process, and the first access device is a target access device in the handover process.

In this embodiment of this application, the trust relationship of the first UE is the same as that of the first UE in the method 200 to the method 500. For details, refer to the related descriptions in the method 200 to the method 500. Details are not provided herein again.

S620. Perform or refuse, based on the trust relationship, resource scheduling established by the first UE and second UE in a PC5 connection.

In this embodiment of this application, the first access network device may judge, based on the trust relationship, whether the second UE is trusted UE of the first UE, and if so, perform resource scheduling established by the first UE and second UE in the PC5 connection, otherwise, refuse the resource scheduling established by the first UE and second UE in the PC5 connection, thereby further ensuring the security of relay communication.

FIG. 7 is still another schematic flowchart of a communication method for trusted or untrusted relay according to an embodiment of this application. The method 700 may be performed by first UE, a 5G DDNMF, a UDM, and an application server (AF). In other words, the method may be performed by software or hardware installed in the first UE, the 5G DDNMF, the UDM, and the application server (AF). As shown in FIG. 7, the method may include the following steps.

S711. The first UE sends a discovery request to the 5G DDNMF, where the discovery request is used to request the network side to provide a relay service code. In some embodiments, the discovery request may carry 0 or more identifiers (the user identifier or the terminal identifier) of the second UE.

S712. The 5G DDNMF sends a binding relationship obtaining request (also referred to as a trust relationship obtaining request) to the UDM and/or the application server, where the binding relationship obtaining request is used to obtain a binding relationship (also referred to as a trust relationship) of the first UE, and the binding relationship is a relationship between two or more users.

In some embodiments, the binding relationship obtaining request further includes the identifier of the second UE, which is used to indicate that it is requested to obtain the association relationship between the first UE and the second UE.

S713. The UDM provides a binding relationship to the 5G DDNMF, and the 5G DDNMF generates relationship information based on the binding relationship provided by the UDM. The application server determines a binding relationship with the first UE based on a service level, and generates the relationship information based on the binding relationship.

The relationship information may include at least one of the following: a first relay service code, a group key, indication information indicating whether the first UE and the second UE have a binding relationship (for example, if the indication information includes the identifier of the second UE, it indicates that the first UE and the second UE have a binding relationship), or a user identifier or a terminal identifier (there may be one or more identifiers, that is, indicating one or more users bound to the first UE), authentication information, a service type (such as a binding relationship on a specific service), a binding slice (a binding relationship on a specific slice), a binding DNN (a binding relationship on a specific DNN), a binding PDU session type (a binding relationship on a specific PDU session type), or the like.

In a possible implementation, the 5G DDNMF may deliver the relationship information to each user equipment with a binding relationship.

S714. The 5G DDNMF or the application server sends the first relay service code and/or the group key to the first UE.

Figure 8:
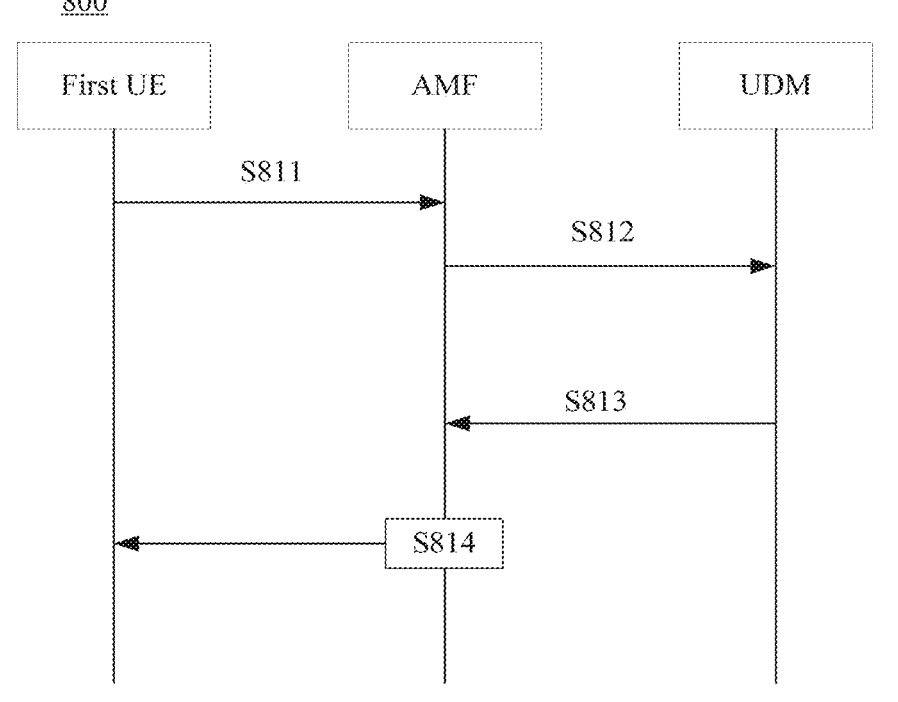
FIG. 8 is still another schematic flowchart of a communication method for trusted or untrusted relay according to an embodiment of this application.

FIG. 8 is still another schematic flowchart of a communication method for trusted or untrusted relay according to an embodiment of this application. The method 800 may be performed by first UE, an AMF, and a UDM. In other words, the method may be performed by software or hardware installed in the first UE, the AMF, and the UDM. As shown in FIG. 8, the method may include the following steps.

S811. The first UE sends a binding relationship authentication request (also referred to as a trust relationship obtaining request) to the AMF, where the binding relationship authentication request carries the identifier of the second UE, and the binding relationship authentication request is used to request the AMF to authenticate whether second UE has a binding relationship with the first UE.

S812. The AMF sends a binding relationship retrieval to the UDM, to retrieve the binding relationship of the first UE, and the retrieval request message carries the identifier of the first UE.

S813. The AMF receives the binding relationship provided by the UDM.

S814. The AMF judges, based on the binding relationship, whether the first UE and the second UE have a binding relationship, and sends a judgment result to the first UE.

Figure 9:
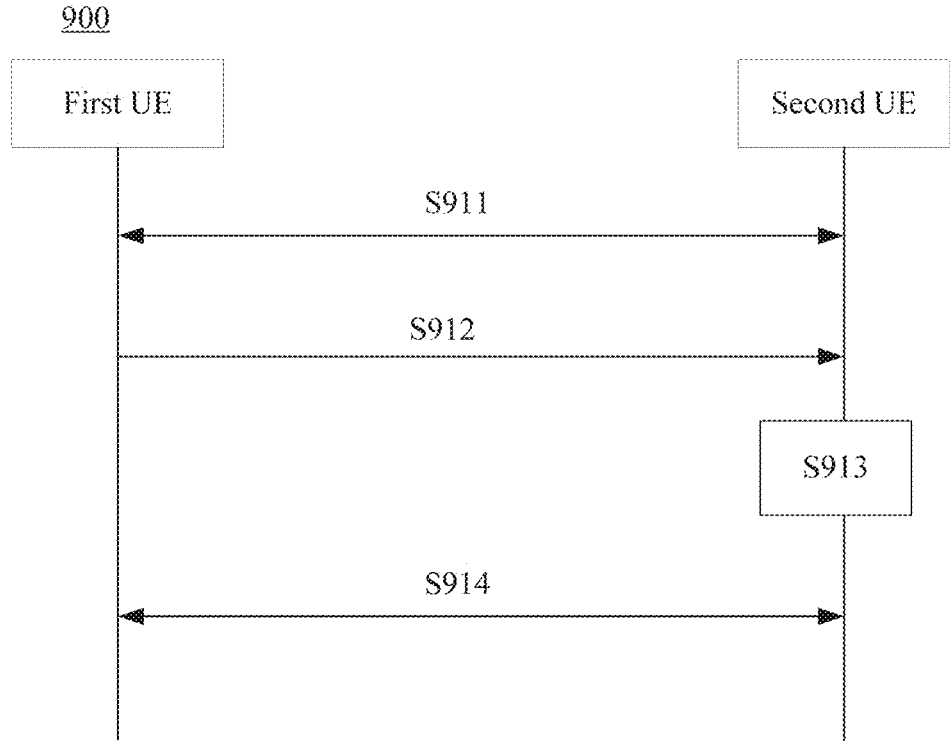
FIG. 9 is still another schematic flowchart of a communication method for trusted or untrusted relay according to an embodiment of this application.

FIG. 9 is still another schematic flowchart of a communication method for trusted or untrusted relay according to an embodiment of this application. The method 900 may be performed by first UE and second UE. In other words, the method may be performed by software or hardware installed in the first UE and the second UE. As shown in FIG. 9, the method may include the following steps.

S911. The first UE and the second UE perform a discovery process or a connection establishment process.

S912. The first UE carries identification information in a discovery message or a direct communication request message, where the identification information is used to indicate the trust relationship of the first UE.

The identification information may include the first relay service code and the group key.

S913. The second UE selects the first UE based on the identification information and the relationship information delivered from the network side.

The second UE may judge whether the first relay service code sent by the first UE is the same as the second relay service code in the relationship information delivered from the network side, and if so, the second UE may select the first UE for relay.

S914. The second UE and the first UE authenticate each other based on the group key, and determine whether the peer is the credit UE.

Through the communication method for trusted or untrusted relay provided in this embodiment of this application, when the second UE performs relay connection and/or relay communication with the first UE, it can be determined whether the peer is the credit UE, thereby ensuring the security of relay communication.

It should be noted that, the communication method for trusted or untrusted relay provided in this embodiment of this application may be performed by a communication apparatus for trusted or untrusted relay or a control module that is in the communication apparatus for trusted or untrusted relay and that is configured to perform the communication method for trusted or untrusted relay. In this embodiment of this application, the communication apparatus for trusted or untrusted relay provided in this embodiment of this application is described by using an example in which the communication method for trusted or untrusted relay is performed by the communication apparatus for trusted or untrusted relay.

Figure 10:
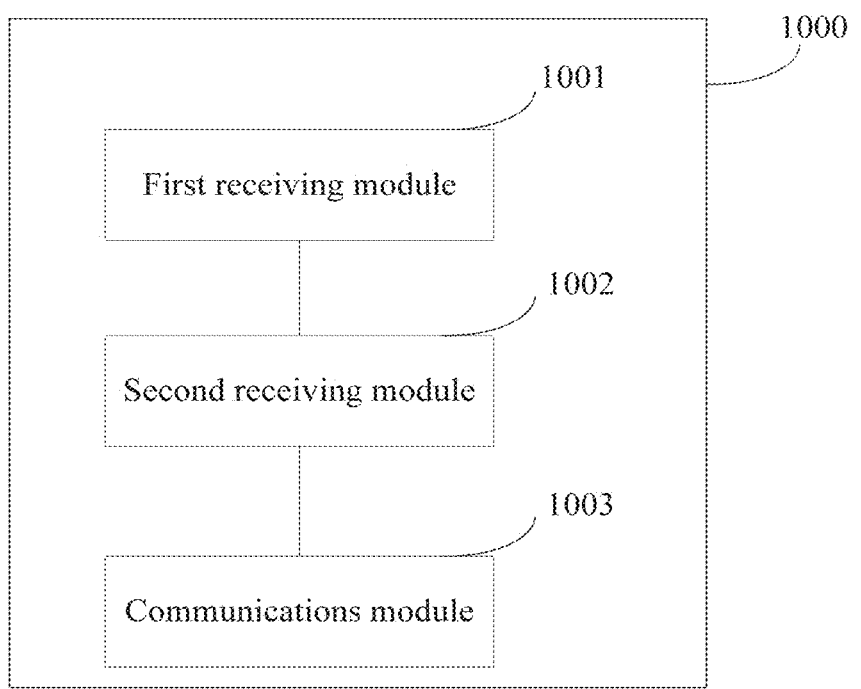
FIG. 10 is a schematic structural diagram of a communication apparatus for trusted or untrusted relay according to an embodiment of this application.

FIG. 10 is a schematic structural diagram of a communication apparatus for trusted or untrusted relay according to an embodiment of this application. As shown in FIG. 10, the communication apparatus for trusted or untrusted relay 1000 may include a first receiving module 1001, a second receiving module 1002, and a communications module 1003.

In this embodiment of this application, the first receiving module 1001 is configured to receive relationship information delivered from a network side, where the relationship information is used to indicate a trust relationship of the first UE; the second receiving module 1002 is configured to receive identification information sent by second UE; and the communications module 1003 is configured to: based on the relationship information and the identification information, perform relay connection and/or relay communication with the second UE, or refuse to perform relay connection and/or relay communication with the second UE.

In a possible implementation, the relationship information includes at least one of the following:

a first relay service code;

an association identifier, where the association identifier is used to indicate that the first UE has a trust relationship with the second UE, or the association identifier is used to indicate a terminal identifier or a user identifier of the second UE that has a trust relationship with the first UE;

a first group key;

authentication information, where the authentication information is used to verify the identification information;

first service type information;

first slice information; or first PDU session type information.

In a possible implementation, the identification information includes at least one of the following:

a second relay service code;

a terminal identifier or a user identifier of the second UE;

encrypted information or authentication information generated based on a second group key;

verification information, where the verification information is a result obtained from verifying and calculating specified information to be verified;

second service type information;

second slice information; or second protocol data unit (PDU) session type information.

In a possible implementation, further including a first sending module, where the first sending module is configured to; before the first receiving module 1001 receives the relationship information delivered from the network side, send the identification information of the second UE to the network side; and that the first receiving module 1001 receives the relationship information delivered from the network side includes: receiving a result returned by the network side for the identification information of the second UE, where the result includes the relationship information.

In a possible implementation, the communications module 1003 is further configured to:

send a trust relationship authentication request to a third network function when performing relay connection and/or relay communication with the second UE, where the trust relationship authentication request carries the user identifier or terminal identification information of the second UE;

receive a trust relationship authentication result sent by a third network function; and perform relay connection and/or relay communication with the second UE based on the trust relationship authentication result, or refuse to perform relay connection and/or relay communication with the second UE.

The communication apparatus for trusted or untrusted relay in this embodiment of this application may be an apparatus, or a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The communication apparatus for trusted or untrusted relay in this embodiment of this application may be an apparatus with an operating system. The operating system may be an Android operating system, an iOS operating system, or another possible operating system. This is not specifically limited in the embodiments of this application.

The communication apparatus for trusted or untrusted relay provided in this embodiment of this application can implement the processes implemented by the first UE in the method embodiment shown in FIG. 2 to FIG. 9, and a same technical effect can be achieved. To avoid repetition, details are not described herein again.

Figure 11:
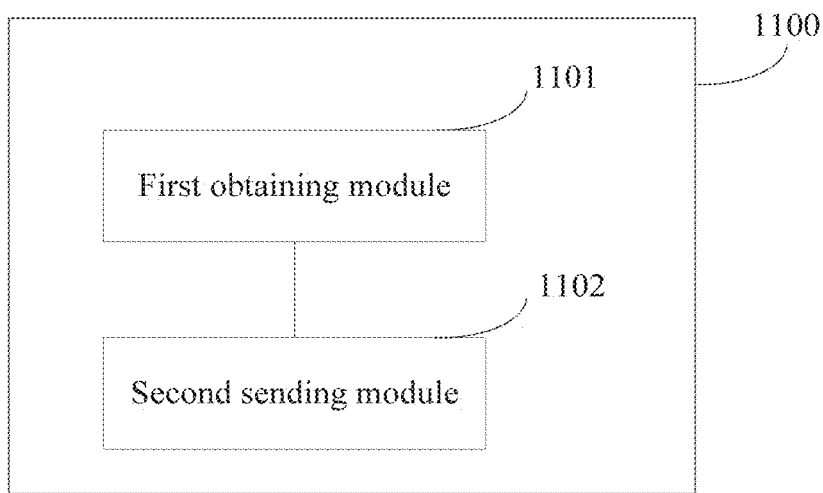
FIG. 11 is another schematic structural diagram of a communication apparatus for trusted or untrusted relay according to an embodiment of this application.

FIG. 11 is another schematic structural diagram of a communication apparatus for trusted or untrusted relay according to an embodiment of this application. As shown in FIG. 11, the communication apparatus for trusted or untrusted relay 1100 includes a first obtaining module 1101 and a second sending module 1102.

In this embodiment of this application, the first obtaining module 1101 is configured to obtain relationship information, where the relationship information is used to indicate a trust relationship of the first UE; and the second sending module 1102 is configured to send the relationship information.

In a possible implementation, the relationship information includes at least one of the following:

a first relay service code;

an association identifier, where the association identifier is used to indicate that the first UE has a trust relationship with the second UE, or the association identifier is used to indicate a terminal identifier or a user identifier of the second UE that has a trust relationship with the first UE;

a first group key;

authentication information, where the authentication information is used to verify the identification information;

first service type information;

first slice information; or first PDU session type information.

In a possible implementation, further including a third receiving module, where the second sending module 1102 is further configured to: before sending the relationship information to the first UE, send a trust relationship obtaining request to a second network function or an application server, where the trust relationship obtaining request carries a user identifier or a terminal identifier of the first UE; and the third receiving module is configured to receive the trust relationship of the first UE returned by the second network function or the application server.

In a possible implementation, the trust relationship is an association relationship between two or more users.

In a possible implementation, the two or more users are users of one of the following: a specific service, a specific slice, a specific DNN, or a specific PDU session.

In a possible implementation, that the second sending module 1102 sends the relationship information to the first UE includes:

generating the relationship information based on the trust relationship returned by the second network function and delivering the relationship information to the first UE; or forwarding the trust relationship returned by the application server to the first UE.

The communication apparatus for trusted or untrusted relay provided in this embodiment of this application can implement the processes implemented by the first network function in the method embodiment shown in FIG. 2 to FIG. 9, and a same technical effect can be achieved. To avoid repetition, details are not described herein again.

Figure 12:
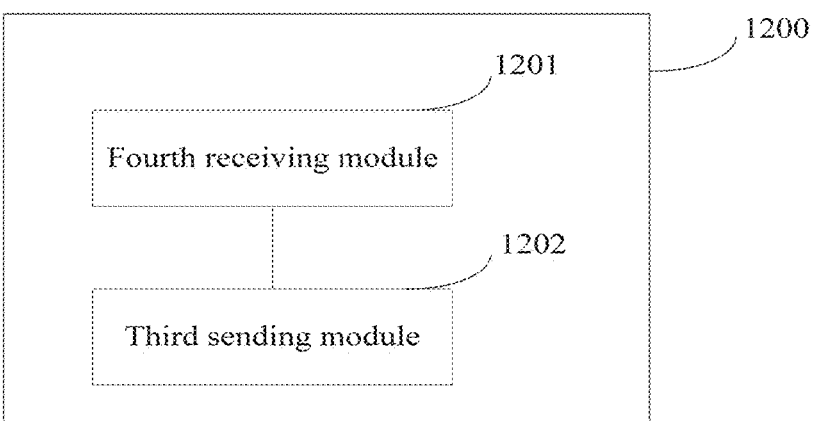
FIG. 12 is still another schematic structural diagram of a communication apparatus for trusted or untrusted relay according to an embodiment of this application.

FIG. 12 is still another schematic structural diagram of a communication apparatus for trusted or untrusted relay according to an embodiment of this application. As shown in FIG. 12, the communication apparatus for trusted or untrusted relay 1200 may include a fourth receiving module 1201 and a third sending module 1202.

In this embodiment of this application, the fourth receiving module 1201 is configured to receive a first trust relationship obtaining request sent by a first network function, where the first trust relationship obtaining request carries a user identifier or a terminal identifier of first UE; and the third sending module 1202 is configured to send a trust relationship of the first UE to the first network function.

In a possible implementation, the trust relationship is an association relationship between two or more users.

In a possible implementation, the two or more users are users of one of the following: a specific service, a specific slice, a specific DNN, or a specific PDU session.

In a possible implementation, the first trust relationship obtaining request further carries a user identifier or a terminal identifier of second UE.

In a possible implementation, the fourth receiving module 1201 is further configured to receive a second trust relationship obtaining request from a third network function, where the second trust relationship obtaining request carries identification information of the first UE; and the third sending module 1202 is further configured to send a trust relationship of the first UE to the third network function.

The communication apparatus for trusted or untrusted relay provided in this embodiment of this application can implement the processes implemented by the second network function in the method embodiment shown in FIG. 2 to FIG. 9, and a same technical effect can be achieved. To avoid repetition, details are not described herein again.

Figure 13:
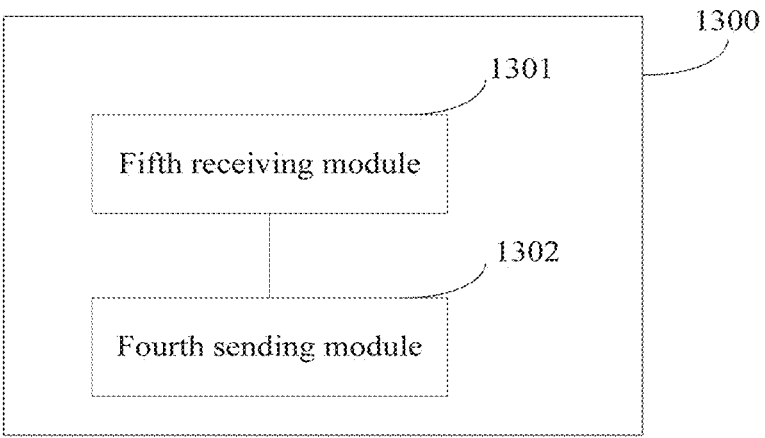
FIG. 13 is still another schematic structural diagram of a communication apparatus for trusted or untrusted relay according to an embodiment of this application.

FIG. 13 is still another schematic structural diagram of a communication apparatus for trusted or untrusted relay according to an embodiment of this application. As shown in FIG. 13, the communication apparatus for trusted or untrusted relay 1300 may include a fifth receiving module 1301 and a fourth sending module 1302.

In this embodiment of this application, the fifth receiving module 1301 is configured to receive a trust relationship authentication request sent by first UE, where the trust relationship authentication request carries a user identifier or terminal identification information of second UE; and the fourth sending module 1302 is configured to send a trust relationship authentication result to the first UE based on a trust relationship of the first UE.

In a possible implementation, the fourth sending module 1302 is further configured to: before sending the trust relationship authentication result to the first UE, send a trust relationship obtaining request to a second network function, where the trust relationship obtaining request carries identification information of the first UE; and the fifth receiving module 1301 is further configured to receive the trust relationship of the first UE returned by the second network function.

In a possible implementation, the fourth sending module 1302 is further configured to send the trust relationship to an access network device corresponding to the first UE.

The communication apparatus for trusted or untrusted relay provided in this embodiment of this application can implement the processes implemented by the third network function in the method embodiment shown in FIG. 2 to FIG. 9, and a same technical effect can be achieved. To avoid repetition, details are not described herein again.

Figure 14:
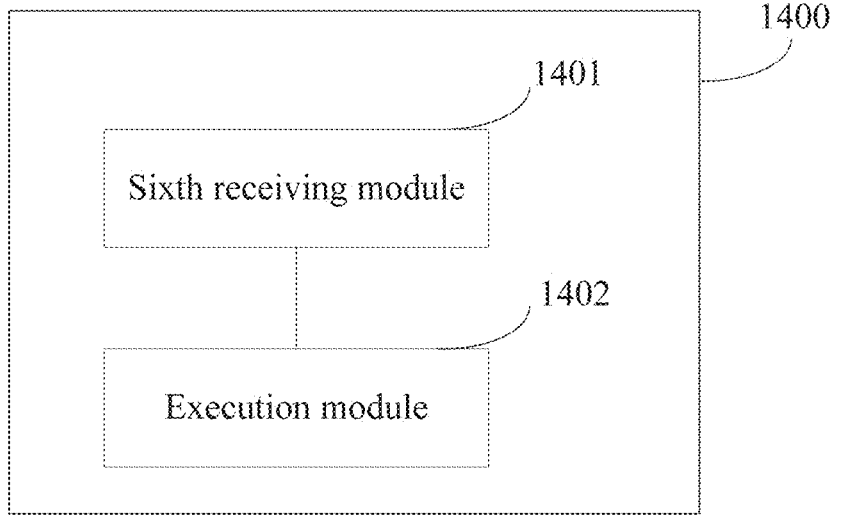
FIG. 14 is still another schematic structural diagram of a communication apparatus for trusted or untrusted relay according to an embodiment of this application.

FIG. 14 is still another schematic structural diagram of a communication apparatus for trusted or untrusted relay according to an embodiment of this application. As shown in FIG. 14, the communication apparatus for trusted or untrusted relay 1400 may include a sixth receiving module 1401 and an execution module 1402.

In this embodiment of this application, the sixth receiving module 1401 is configured to receive a trust relationship of first UE sent by a second access network device or a third network function; and the execution module 1402 is configured to: perform or refuse, based on the trust relationship, resource scheduling established by the first UE and second UE in a PC5 connection.

In a possible implementation, that the sixth receiving module 1401 receives the trust relationship of the first UE sent by the second access network device or the third network function includes:

in a registration process or a service request process of the first UE, receiving the trust relationship sent by the third network function; or in a handover process of the first UE, receiving the trust relationship sent by the second access device, where the second access device is a source access device in the handover process, and the first access device is a target access device in the handover process.

The communication apparatus for trusted or untrusted relay provided in this embodiment of this application can implement the processes implemented by the first access network device in the method embodiment shown in FIG. 2 to FIG. 9, and a same technical effect can be achieved. To avoid repetition, details are not described herein again.

Figure 15:
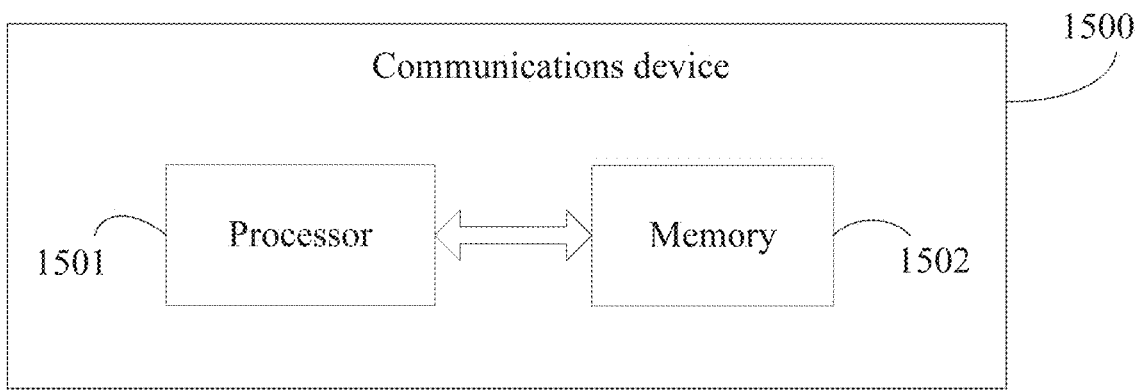
FIG. 15 is a schematic structural diagram of a communications device according to an embodiment of this application.

As shown in FIG. 15, an embodiment of this application further provides a communications device 1500, including a processor 1501, a memory 1502, a program or an instruction stored in the memory 1502 and executable on the processor 1501. For example, when the communications device 1500 is a terminal, the program or the instruction is executed by the processor 1501 to implement the processes in the embodiment of the communication method for trusted or untrusted relay 200, and a same technical effect can be achieved. When the communications device 1500 is a network side device, the program or the instruction is executed by the processor 1501 to implement the processes in the embodiments of the communication methods for trusted or untrusted relay 300 to 600, and a same technical effect can be achieved. To avoid repetition, details are not described herein again.

Figure 16:
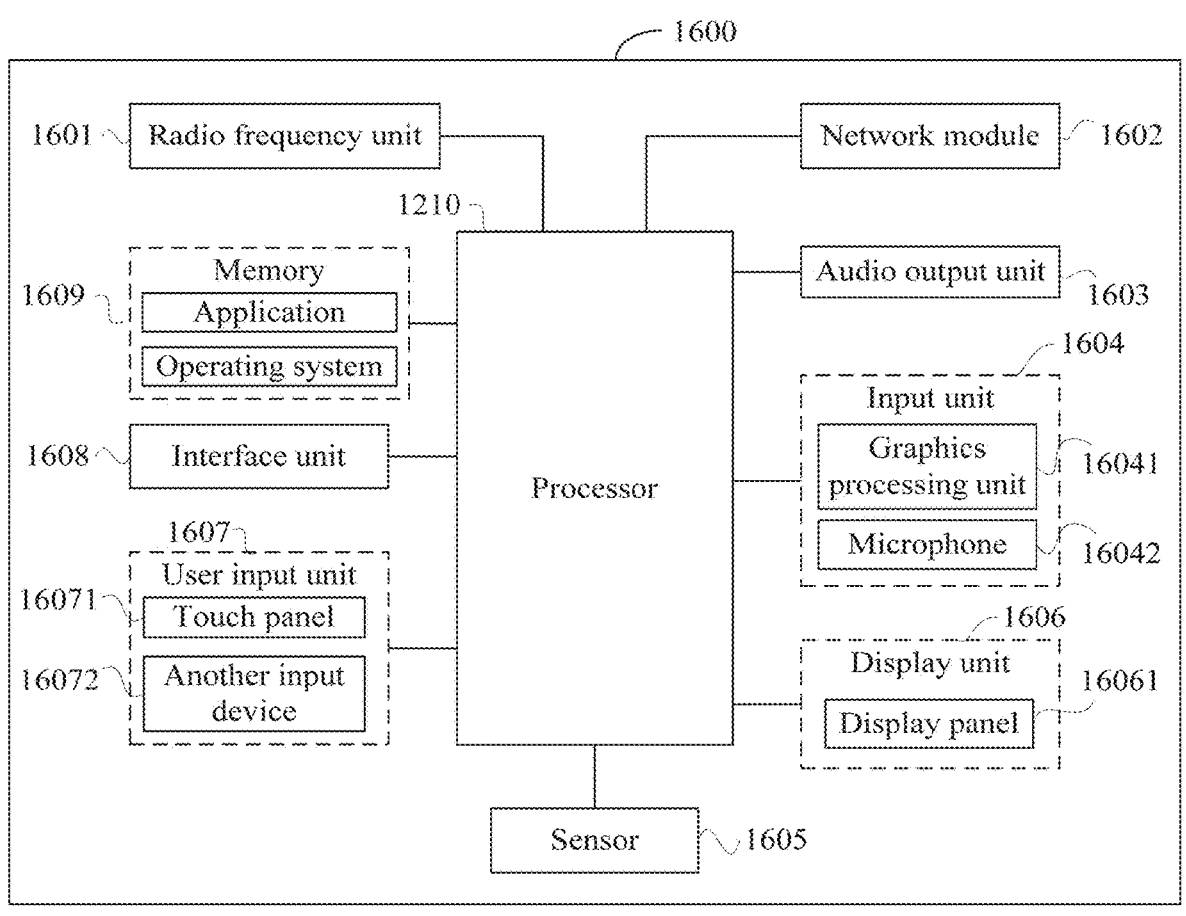
FIG. 16 is a schematic diagram of a hardware structure of a terminal according to an embodiment of this application.

FIG. 16 is a schematic diagram of a hardware structure of a terminal according to an embodiment of this application.

The terminal 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, and a processor 1610.

A person skilled in the art can understand that the terminal 1600 may further include a power supply (such as a battery) that supplies power to each component. The power supply may be logically connected to the processor 1610 by using a power supply management system, to implement functions such as charging and discharging management, and power consumption management by using the power supply management system. The terminal structure shown in FIG. 16 constitutes no limitation on the terminal, and the terminal may include more or fewer components than those shown in the figure, or combine some components, or have different component arrangements. Details are not described herein.

It should be understood that, in this embodiment of this application, the input unit 1604 may include a Graphics Processing Unit (GPU) 16041 and a microphone 16042, and the graphics processing unit 16041 processes image data of a still picture or a video obtained by an image capture apparatus (for example, a camera) in a video capture mode or an image capture mode. The display unit 1606 may include a display panel 16061. In some embodiments, the display panel 16061 may be configured in a form such as a liquid crystal display or an organic light-emitting diode. The user input unit 1607 includes a touch panel 16071 and another input device 16072. The touch panel 16071 is also referred to as a touchscreen. The touch panel 16071 may include two parts: a touch detection apparatus and a touch controller. The another input device 16072 may include but is not limited to a physical keyboard, a functional button (such as a volume control button or a power on/off button), a trackball, a mouse, and a joystick. Details are not described herein.

In this embodiment of this application, the radio frequency unit 1601 receives downlink data from a network side device and then sends the downlink data to the processor 1610 for processing; and sends uplink data to the network side device. Usually, the radio frequency unit 1601 includes but is not limited to an antenna, at least one amplifier, a transceiver, a coupler, a low noise amplifier, a duplexer, and the like.

The memory 1609 may be configured to store a software program or an instruction and various data. The memory 1609 may mainly include a program or instruction storage area and a data storage area. The program or instruction storage area may store an operating system, and an application or an instruction required by at least one function (for example, a sound playing function or an image playing function). In addition, the memory 1609 may include a high speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 1610 may include one or more processing units. In some embodiments, an application processor and a modem processor may be integrated into the processor 1610. The application processor mainly processes an operating system, a user interface, an application, an instruction, or the like. The modem processor mainly processes wireless communications, for example, a baseband processor. It can be understood that, the modem processor may not be integrated into the processor 1610.

The radio frequency unit 1601 is configured to: receive relationship information delivered from a network side, where the relationship information is used to indicate a trust relationship of the first UE; and receive identification information sent by second UE.

The processor 1610 is configured to: based on the relationship information and the identification information, perform relay connection and/or relay communication with the second UE, or refuse to perform relay connection and/or relay communication with the second UE.

Figure 17:
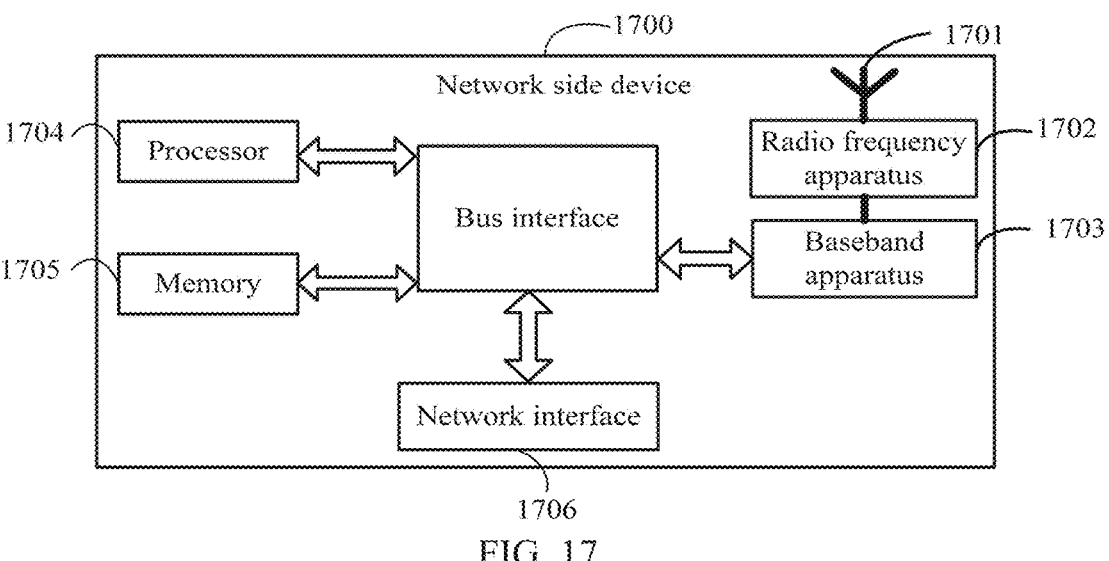
FIG. 17 is a schematic diagram of a hardware structure of a network side device according to an embodiment of this application.

An embodiment of this application further provides a network side device. As shown in FIG. 17, a network device 1700 includes an antenna 1701, a radio frequency apparatus 1702, and a baseband apparatus 1703. The antenna 1701 is connected to the radio frequency apparatus 1702. In an uplink direction, the radio frequency apparatus 1702 receives information by using the antenna 1701, and sends the received information to the baseband apparatus 1703 for processing. In a downlink direction, the baseband apparatus 1703 processes to-be-sent information, and sends the to-be-sent information to the radio frequency apparatus 1702. After processing the received information, the radio frequency apparatus 1702 sends the information by using the antenna 1701.

The foregoing band processing apparatus may be located in the baseband apparatus 1703. In the foregoing embodiment, a method performed by the network side device may be implemented in the baseband apparatus 1703. The baseband apparatus 1703 includes a processor 1704 and a memory 1705.

The baseband apparatus 1703 may include, for example, at least one baseband board, where a plurality of chips are disposed on the baseband board. As shown in FIG. 17, one chip is, for example, the processor 1704, which is connected to the memory 1705, so as to invoke a program in the memory 1705 to perform operations of the network device shown in the foregoing method embodiment.

The baseband apparatus 1703 may further include a network interface 1706, configured to exchange information with the radio frequency apparatus 1702, where the interface is, for example, a common public radio interface (CPRI).

The network side device in this embodiment of the present application further includes an instruction or a program stored in the memory 1705 and executable on the processor 1704. The processor 1704 invokes the instruction or the program in the memory 1705 to perform the method performed by the modules shown in FIG. 11 to FIG. 14, and a same technical effect can be achieved. To avoid repetition, details are not provided herein again.

An embodiment of this application further provides a readable storage medium, where the readable storage medium stores a program or an instruction, and when the program or the instruction is executed by a processor, the processes of the embodiment of the foregoing communication method for trusted or untrusted relay are implemented, and a same technical effect can be achieved. To avoid repetition, details are not described herein again.

The processor is a processor in the terminal in the foregoing embodiment. The readable storage medium includes a computer-readable storage medium such as a Read-Only Memory (ROM), a Random Access Memory (RAM), a magnetic disk, an optical disc, or the like.

An embodiment of this application further provides a chip, where the chip includes a processor and a communications interface, the communications interface is coupled to the processor, and the processor is configured to run a program or an instruction of a network side device to implement the processes of the embodiment of the foregoing communication method for trusted or untrusted relay, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as an ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. A communication method for a relay, comprising:
receiving, by first user equipment (UE), identification information sent by second UE;
sending, by the first UE, identification information of the second UE to a network side device;
receiving, by the first UE, relationship information returned by the network side device for the identification information of the second UE, wherein the relationship information is used to determine a trusted UE of the first UE; and
based on the relationship information and the identification information, performing, by the first UE, relay connection or relay communication with the second UE, or refusing, by the first UE, to perform relay connection or relay communication with the second UE, wherein the second UE includes a relay UE.

2. The communication method according to claim 1, wherein the relationship information comprises at least one of the following:
a first relay service code;
an association identifier, wherein the association identifier is used to indicate that the first UE has a trust relationship with the second UE, or the association identifier is used to indicate a terminal identifier or a user identifier of the second UE that has a trust relationship with the first UE;
a first group key;
authentication information, wherein the authentication information is used to verify the identification information;
first service type information;
first slice information; or
first protocol data unit (PDU) session type information, wherein the identification information comprises at least one of the following:
a second relay service code;

a terminal identifier or a user identifier of the second UE;
encrypted information or authentication information generated based on a second group key;
verification information, wherein the verification information is a result obtained from verifying and calculating specified information to be verified;
second service type information;
second slice information; or
second protocol data unit (PDU) session type information.

3. The communication method according to claim 1, further comprising:
sending, by the first UE, a trust relationship authentication request to a network function when performing relay connection or relay communication with the second UE, wherein the trust relationship authentication request carries a user identifier or terminal identification information of the second UE;
receiving, by the first UE, a trust relationship authentication result sent by the network function; and
performing, by the first UE, relay connection or relay communication with the second UE based on the trust relationship authentication result, or refusing, by the first UE, to perform relay connection or relay communication with the second UE.

4. A communication method for a relay, comprising:
receiving, by first user equipment (UE), identification information sent by second UE;
sending, by the first UE, identification information of the second UE to a first network function;
sending, by the first network function, relationship information to the first UE for the identification information of the second UE, wherein the relationship information is used to determine a trusted UE of the first UE; and
based on the relationship information and the identification information, performing, by the first UE, relay connection or relay communication with the second UE, or refusing, by the first UE, to perform relay connection or relay communication with the second UE, wherein the second UE includes a relay UE.

5. The communication method according to claim 4, wherein the relationship information comprises at least one of the following:
a first relay service code;
an association identifier, wherein the association identifier is used to indicate that the first UE has a trust relationship with the second UE, or the association identifier is used to indicate a terminal identifier or a user identifier of the second UE that has a trust relationship with the first UE;
a first group key;
authentication information, wherein the authentication information is used to verify the identification information;
first service type information;
first slice information; or
first protocol data unit (PDU) session type information.

6. The communication method according to claim 4, wherein before sending the relationship information to the first UE, the method further comprises:
sending, by the first network function, a trust relationship obtaining request to a second network function or an application server, wherein the trust relationship obtaining request carries a user identifier or a terminal identifier of the first UE; and receiving, by the first network function, the trust relationship of the first UE returned by the second network function or the application server.

7. The communication method according to claim 6, wherein the trust relationship is an association relationship between two or more users, wherein the two or more users are users of one of the following: a service, a slice, a data network name (DNN), or a protocol data unit (PDU) session.

8. The communication method according to claim 6, wherein sending the relationship information to the first UE comprises:

generating, by the first network function, the relationship information based on the trust relationship returned by the second network function and delivering the relationship information to the first UE; or forwarding, by the first network function, the relationship information returned by the application server to the first UE.

9. A communication method for a relay, comprising:

receiving, by first user equipment (UE), identification information sent by second UE;

sending, by the first UE, identification information of the second UE to a first network function;

receiving, by a second network function, a first trust relationship obtaining request sent by the first network function, wherein the first trust relationship obtaining request carries a user identifier or a terminal identifier of first user equipment (UE);

sending, by the second network function, a trust relationship of the first UE to the first network function; and sending, by the first network function, relationship information to the first UE for the identification information of the second UE, wherein the relationship information is used to determine a trusted UE of the first UE.

10. The communication method according to claim 9, wherein the trust relationship is an association relationship between two or more users.

11. The communication method according to claim 10, wherein the two or more users are users of one of the following: a service, a slice, a data network name (DNN), or a protocol data unit (PDU) session.

12. The communication method according to claim 9, wherein the first trust relationship obtaining request further carries a user identifier or a terminal identifier of second UE.

13. The communication method according to claim 9, further comprising:

receiving, by the second network function, a second trust relationship obtaining request from a third network function, wherein the second trust relationship obtaining request carries identification information of the first UE; and sending, by the second network function, the trust relationship of the first UE to the third network function.

14. A terminal, comprising:

a memory storing a computer program; and a processor coupled to the memory and configured to execute the computer program to perform operations of the communication method for a relay according to claim 1.

15. The terminal according to claim 14, further performing operations comprising:

sending, by the first UE, a trust relationship authentication request to a network function when performing relay connection or relay communication with the second UE, wherein the trust relationship authentication request carries a user identifier or terminal identification information of the second UE;

receiving, by the first UE, a trust relationship authentication result sent by the network function; and performing, by the first UE, relay connection or relay communication with the second UE based on the trust relationship authentication result, or refusing, by the first UE, to perform relay connection or relay communication with the second UE.

16. A network side device, comprising:

a memory storing a computer program; and a processor coupled to the memory and configured to execute the computer program to perform operations of the communication method for a relay according to claim 4.

17. The network side device according to claim 16, further performing operations comprising:

sending, by the first network function, a trust relationship obtaining request to a second network function or an application server, wherein the trust relationship obtaining request carries a user identifier or a terminal identifier of the first UE; and receiving, by the first network function, the trust relationship of the first UE returned by the second network function or the application server.

18. A network side device, comprising:

a memory storing a computer program; and a processor coupled to the memory and configured to execute the computer program to perform operations of the communication method for a relay according to claim 9.

* * * * *